(12) United States Patent
Johnson et al.

(10) Patent No.: US 10,195,699 B2
(45) Date of Patent: Feb. 5, 2019

(54) SUCKER ROD

(71) Applicant: TRC Services, Inc., The Woodlands, TX (US)

(72) Inventors: Michael Eric Johnson, The Woodlands, TX (US); Donald Mike Johnson, The Woodlands, TX (US); Aleksei Averyanov, Vidnoe (RU); Viktor Smerdin, Reutov (RU)

(73) Assignee: TRC Services, Inc., The Woodlands, TX (US)

( * ) Notice: Subject to any disclaimer, the term of this patent is extended or adjusted under 35 U.S.C. 154(b) by 207 days.

(21) Appl. No.: 14/927,132

(22) Filed: Oct. 29, 2015

(65) Prior Publication Data

US 2016/0047173 A1 Feb. 18, 2016

Related U.S. Application Data

(63) Continuation-in-part of application No. 13/594,246, filed on Aug. 24, 2012, now Pat. No. 9,278,412.

(51) Int. Cl.
*B23P 6/00* (2006.01)

(52) U.S. Cl.
CPC .......... *B23P 6/00* (2013.01); *Y10T 29/49238* (2015.01)

(58) Field of Classification Search
CPC ............... B23P 6/00; Y10T 29/49238; Y10T 29/49718; Y10T 29/49748; B23G 9/009;
(Continued)

(56) References Cited

U.S. PATENT DOCUMENTS 2,103,236 A    12/1937   Coshow
3,089,031 A *   5/1963   Eudter ................ G01N 23/205
                                                                      378/71

(Continued)

FOREIGN PATENT DOCUMENTS

CN         1199809 A     11/1998
CN        101249507 A      8/2008
(Continued)

OTHER PUBLICATIONS

Bogatov RU 2356718 C2 English Translation.*
(Continued)

*Primary Examiner* — Jason L Vaughan
*Assistant Examiner* — Amanda Meneghini
(74) *Attorney, Agent, or Firm* — Ramey & Schwaller

(57) ABSTRACT

The disclosure relates to the treatment of rods made of metal, particularly to the method of reclamation of used standard length rods, such as pump rods already used in the mechanical deep-pumping extraction of oil, as well as to the product made with the help of the mentioned method. The method of remanufacturing of standard length rods includes the reheating of the rod body to a temperature favorable for the plastic treatment of the rod such as plastic deformation of the rod body under pressure. Such methods allow for the reclamation of rods of the desired geometric form and enhancement of the mechanical properties of the remanufactured rod. The technical outcome of the claimed invention consists in the reclamation of rods of the desired geometric form and enhancement of the mechanical properties of the remanufactured rod.

9 Claims, 1 Drawing Sheet

(58) Field of Classification Search
CPC .... B21D 3/00; B21D 3/16; B21D 3/14; H01J 49/00; H01J 49/0022; H01J 49/05; H01J 49/161; G01T 1/36
USPC .............................................. 378/44, 70, 71
See application file for complete search history.

(56) References Cited

U.S. PATENT DOCUMENTS

| | | | | |
|---|---|---|---|---|
| 3,958,049 | A | * 5/1976 | Payne | E21B 17/006 |
| | | | | 166/176 |
| 4,045,591 | A | 8/1977 | Payne | |
| 4,582,242 | A | * 4/1986 | Spindler | B23K 20/129 |
| | | | | 228/113 |
| 4,655,852 | A | 4/1987 | Rallis | |
| 4,877,386 | A | 10/1989 | Hinds | |
| 5,715,053 | A | * 2/1998 | Loge | G01N 21/718 |
| | | | | 356/318 |
| 7,397,238 | B2 | 7/2008 | Wafters et al. | |
| 7,985,938 | B2 | 7/2011 | Johnson | |
| 8,230,899 | B2 | * 7/2012 | Minisandram | B22D 7/02 |
| | | | | 164/461 |
| 8,281,472 | B2 | 10/2012 | Labonte et al. | |
| 2010/0084322 | A1 | * 4/2010 | Johnson | B07C 5/342 |
| | | | | 209/552 |
| 2013/0291986 | A1 | 11/2013 | Yang | |
| 2014/0124003 | A1 | 5/2014 | White | |

FOREIGN PATENT DOCUMENTS

| | | |
|---|---|---|
| CN | 201685076 U | 12/2010 |
| CN | 101947714 A | 1/2011 |
| CN | 102513361 A | 6/2012 |
| CN | 102581542 A | 7/2012 |
| CN | 103008979 A | 4/2013 |
| RU | 2082590 C1 | 6/1997 |

OTHER PUBLICATIONS

Interlloy 4140 High Tensile Steel.*
Non-Final Office Action dated Aug. 1, 2017, in U.S. Appl. No. 15/011,811.
Non-Final Office Action dated Apr. 4, 2018, in U.S. Appl. No. 15/011,811.
Non-Final Office Action dated Apr. 25, 2018, in U.S. Appl. No. 15/011,832.
International Search Report and Written Opinion dated Mar. 6, 2017, in International Application No. PCT/US16/59304.
Non-Final Office Action dated Aug. 26, 2014, in U.S. Appl. No. 13/594,246.
Final Office Action dated Dec. 22, 2014, in U.S. Appl. No. 13/594,246.
Final Office Action dated Apr. 30, 2015, in U.S. Appl. No. 13/594,246.
Non-Final Office Action dated Sep. 8, 2014, in Canadian Application No. 2,824,658.

* cited by examiner

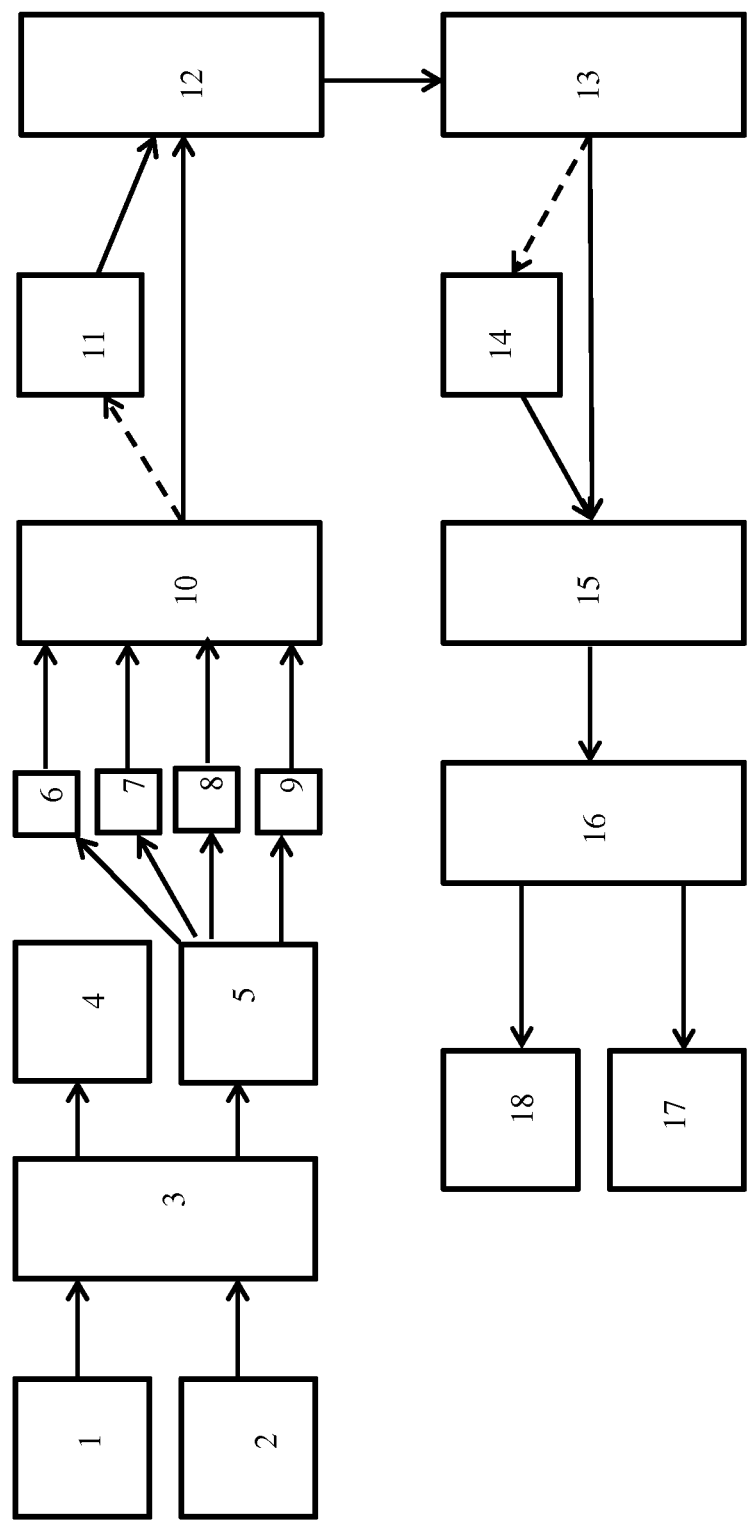

SUCKER ROD

CROSS REFERENCE TO RELATED APPLICATIONS

This application is a continuation-in-part of prior application Ser. No. 13/594,246, filed Aug. 24, 2012.

FIELD

The embodiments of the invention disclosed herein relate to recovery of equipment used in oil production. More specifically, the embodiments of the invention relate to the methods of metal treatment, more particularly to methods of remanufacturing used standard length rods, particularly pump rods typically used in the mechanized oil deep-pumping extraction.

BACKGROUND

A sucker rod is a rigid rod used in the oil industry to join together the surface and downhole components of a reciprocating piston pump installed in an oil well. These rods are typically between 25 and 30 feet (7 to 9 meters) in length, and threaded at both ends.

Prior art discloses a method of hardening rods such as sucker rods with the help of a device with two heads that have the ability to clamp two ends of the rod in need of treatment or modification. See Russian patent RU 2082590. In this embodiment, typically one head turns uncontrollably with the rod treated along its longitudinal central line. Unfortunately, use of the aforementioned device can result in deformation of standard length sucker rods due to tension and torsion, even though cold working the rod's surface would improve the fatigue strength and the efficiency. Additionally another shortcoming of this known method lies in the fact that this device method will not reclaim the proper geometric shape of the rod and eliminate the inner stress in it, which deteriorates the quality of the remanufactured rod and its service life.

Additional methods of remanufacturing sucker rods for re-use is to eliminate the fatigue stress in the used rods by a method involving thermally treating the rods at a temperature between about 200° C. and about 650° C. for 15 to 30 minutes. It consists of normalization, upgrading or tempering, with reference to the material or rods remanufactured. After thermal treatment the rods are straightened while still hot to achieve the required straightness. Additionally, straightening while still hot allows for the removal of stress which can occur otherwise during the course of the straightening procedure.

Typically, in such implementation, the rods undergo shot peening. Shot peening is a cold working process used to produce a compressive residual stress layer and modify mechanical properties of metals. It entails impacting the surface of a metal with shot (round metallic, glass, or ceramic particles) with force sufficient to cause plastic deformation. The shot peening process used on the reclamation of sucker rods removes scale, localizes micro-cracks and improves fatigue strength.

However, the shortcomings of this aforementioned method lie in the fact that worn out or corrosion damaged rods still retain all outside geometrical form defects, even after thermal reclamation.

It would therefore be desirable to create a more efficient method for remanufacturing standard length rods such as sucker rods that would make it possible to improve the quality of the products and decrease defects as compared with the reclamation processes delivered by traditional methods.

SUMMARY

An embodiment of the disclosure is a method for reconditioning a used sucker rod having a given diameter, the method comprising the steps of: a. obtaining a used sucker rod having a diameter and a length; b. removing contaminates from the surface of the sucker rod; c. performing a non-visual inspection of the used sucker rod to determine if the sucker rod is amenable to reconditioning; d. utilizing a metal analyzer to determine a metal composition of the sucker rod; e. categorizing the sucker rod into a class based upon the metal composition of the sucker rod; f. heating the rod until the rod is able to undergo plastic deformation; g. shaping the rod at a temperature wherein plastic deformation occurs; h. cooling the rod; and i. cutting the sucker rod into a desired length. In an embodiment, the metal analyzer is handheld. In an embodiment, the metal analyzer is in-line. In an embodiment, the metal analyzer utilizes X-ray fluorescence spectrometry. In an embodiment, the metal analyzer utilizes X-ray diffraction. In an embodiment, the metal analyzer utilizes arc spark optical emission spectrometery. In an embodiment, the metal analyzer utilizes a laser metals analyzer. In an embodiment, the metal analyzer utilizes laser induced breakdown spectroscopy. In an embodiment, the metal analyzer causes a high temperature plasma to form.

An embodiment of the disclosure is a reconditioned steel rod produced by the method above. In an embodiment, a reconditioned steel rod wherein the rod decreases the diameter of the rod by one standard size and increases the length of the rod. In an embodiment, the reconditioned steel rod has been subjected to shot peening. In an embodiment, the reconditioned steel rod wherein the rod has been cut into a shorter rod and a pony rod. In an embodiment, the reconditioned steel rod wherein end pieces have been forged to the shorter rod.

BRIEF DESCRIPTION OF THE DRAWINGS

FIG. 1 is a flow chart of an embodiment of a method of reconditioning sucker rods, and wherein solid arrows are generally required and dashed arrows are optional.

LIST OF REFERENCE NUMERALS collection process 1 shipment process 2 presortment 3 discarding process 4 grade sortment procedure 5

C 6

D 7

KD 8

High Strength 9 cleaning procedure 10.

rod straightening machine 11 induction furnace 12 pressure machine 13 shot peening 14 cutting procedure 15 final inspection process 16 outside manufacturer 17 factory forging 18

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention is embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

As used herein, the term "sorting" means to arrange according to class, kind, and/or size; to classify.

As used herein, the term "rod" includes hollow or solid rods, continuous rods or joints, and includes welded, flanged, screwed, and other rod goods. In particular, sucker rod joints are one type of rod which can benefit from the methods described herein, but the disclosure is not so limited.

As used herein, the term "used rod" means a rod that has been in actual service for a purpose, such as transporting fluids, connecting a downhole pump to a surface driver, and the like, whether on the surface, downhole, underwater, on-shore, or off-shore. In particular, in the case of sucker rods, used sucker rods are those that are lifted to a holding area where they are uniquely identified according to size, quantity, company name and well location and tagged appropriately.

As used herein the phrase "performing non-visual, non-destructive inspection" means a technique which does not impair the rods from performing their intended function or use, and does not involve a human visual test.

It is a goal of the present invention to remanufacture standard sized rods such as sucker rods by methods which include reheating of the rod body up to a particular temperature and applying pressure in conditions favorable for plastic deformation.

Still further, it is a goal of the present invention to clean the rod devices. Following cleaning, it is a goal of the present invention to presort the rods, such as sucker rods by grade and quality. Following assortment, the methods disclosed herein contemplate cleaning the rod devices. Following cleaning, the methods disclosed herein contemplate straightening the rod devices. Following straightening the rod devices, the methods disclosed herein contemplate subjecting the rod devices to heating to the point wherein plastic deformation occurs for shaping. Following the heating process, the methods disclosed herein contemplate subjecting the rod devices to a rolling mill. Following subjecting the rod devices to a rolling mill, the methods disclosed herein contemplate straightening the rods again if necessary.

Cleaning

Typically, before inspection to sort out unacceptable rods from rods which are able to function for their intended purpose, the rods are cleaned. Typically, in most embodiments of the invention, the used rods are cleaned in a hot kerosene bath to remove paraffin, grease and other foreign materials.

However, in certain embodiments the cleaning process subjects the rods to pressure washing, either with water or with other solvents such as inorganic solvents such as acid baths and the like or organic solvents. Organic solvents contemplated include benzene, ether, gasoline, acetone and the like. Further, it is contemplated that in some embodiments, the cleaning process with certain organic or inorganic solvents does not require the solvents to be blasted against the rods via pressure washing but rather the rods can be dipped, submerged, or subject to low pressure wetting of such solvents in order to clean the rods.

In other embodiments, high pressure air, high pressure inert gases such as nitrogen, or the noble gasses can be used to clean the rods of paraffin, grease and other foreign materials.

In still further embodiments, the rods are shot blasted with sand, polystyrene, glass and the like to remove paraffin, grease and other foreign materials.

It is further contemplated that dry ice cleaning can be used. In such embodiments, the rod is subjected to being blasted with dry ice or surrounded with dry ice in order to remove the aforementioned contaminates. A particular advantage of the use of dry ice is the lack of flammability associated with the use of organic solvents such as kerosene, acetone and the like. An additional advantage of dry ice cleaning is the lack of cleanup of the cleaning material as dry ice sublimates at room temperature and normal atmospheric pressure (1 bar).

Once the rods are clean, typically in most embodiments of the invention, they are subjected to presortment.

Presortment

Typically, rods are collected from petroleum producing sites and brought to a central location for inspection prior to any reconditioning or remanufacturing processes. Visual inspection is typically the first step in the convention reclamation and reconditioning processes.

Typically, the process of visual inspection typically involves a person visually locating pitting, corrosion, wear, stretched rods and bent rods. Any rod which fails to pass this visual inspection is removed from the aforementioned central location as rejected.

However, despite visual inspection, even clean rods can have unseen defects such as cracks that result in such rods being unacceptable for their intended use. Accordingly, sometimes other methods of inspection are used.

In many embodiments of the invention, the methods comprise performing non-visual or non-destructive inspection of used rods prior to any straightening as discussed below.

In order to inspect the rods in a non-visual manner, methods of the invention include passing used rods through one or more stationary inspection stations. Alternatively one or more inspection apparatus is moved along stationary rods. Alternatively, both the used rods and inspection apparatus can move.

In certain embodiments of the invention pertaining to non-visual inspection, magnetic flux leakage inspection is used. Such methods typically involve the use of a magnetic coil and a detector assembly for inspecting the rods. Such systems typically employ one or more magnetic detectors adapted to be spaced a first distance from the rod member by one or more substantially frictionless members during an inspection. Methods specifically pertaining to magnetic flux leakage inspection is found in U.S. Pat. No. 7,397,238, which is herein incorporated by reference in its entirety. In alternative embodiments of the invention, other suitable non-visual, non-destructive inspections include, but are not limited to: ultrasonic inspection, eddy current inspection, acoustic emission inspection, and the like. Furthermore, the data from such tests is presented in one or more formats, including visual format, such as on a CRT screen, flat panel screen, printer, strip chart recorder and the like.

Additionally, in addition to the detection of flaws, the rods, in certain embodiments are separated in to grades of steel. In such embodiments, it is beneficial to determine the grade of the steel rod before any treatment occurs so as to know the physical constraints and properties of the end product. In such embodiments, the grades of steel are typically divided into the following: Class C steel, Class D steel, Class KD steel, and High Strength steel. Within the classes, Class D steel is typically divided by alloy D and carbon D. The terms class and grade can be used interchangeably.

There are several different steel grades in sucker rods, including but not limited to, C, K, Carbon-D, Alloy-D, KD, and High Strength. Knowing what grade of steel is going through the process allows the end product to be graded properly. It is extremely important to grade the sucker rod properly. Each grade of steel sucker rod is utilized for a particular well application. If the grade of sucker rod is not correctly identified, the sucker rod will likely fail after installation in the well. Failure of the sucker rods causes great financial loss. The tensile strength of the C and K grade sucker rods is significantly lower than D and KD grade sucker rods. Therefore, the C and K grade sucker rods are typically used in shallower wells. If a C grade sucker rod was misgraded as a D grade sucker rod and the sucker rod were loaded as if it was a D grade sucker rod, it would fail. K and KD grade sucker rods are more corrosion resistant than the other grades. If a D grade sucker rod was misgraded as a KD grade sucker rod and placed in a corrosive environment, it would fail. In an embodiment, C grade sucker rods are used for low to moderate loads in a non-corrosive environment. In an embodiment, carbon-D sucker rods are used for moderate loads in a non-corrosive environment. In an embodiment, alloy-D sucker rods are used for moderate to heavy loads in a non-corrosive environment. In an embodiment, K grade sucker rods are used for low to moderate loads in a corrosive environment. In an embodiment, KD grade sucker rods are used for moderate to heavy loads in a corrosive environment.

In an embodiment, a piece of equipment is used to quickly analyze the steel. In an embodiment, the equipment is handheld. In an embodiment, the equipment is in-line. In an embodiment, the equipment is a metal analyzer. In an embodiment, the metal analyzer utilizes X-ray fluorescence spectrometry. In an embodiment, the metal analyzer utilizes X-ray diffraction. In an embodiment, the metal analyzer utilizes arc spark optical emission spectrometery. In an embodiment, the metal analyzer utilizes a laser metals analyzer. In an embodiment, the metal analyzer utilizes laser induced breakdown spectroscopy. In an embodiment, the metal analyzer causes a high temperature plasma to form.

Straightening

Typically, in many embodiments of the invention, rods that have not been rejected, but that are bent or still possess rod guides are sent to a rod straightening machine and/or a rod guide removal machine. Typically, in many embodiments of the invention, once the rods have been straightened and no longer have rod guides, they are returned to the aforementioned central location.

Heating and Shaping

In certain embodiments of the invention, upon straightening of used rods, the rods are subjected to heating. In such embodiments, a rod such as a sucker rod in need of reclamation is heated to a temperature favorable for plastic deformation of the rod. In the case of steel, the temperature is within the range of about 900° C. to about 1300° C. This temperature range is known to be used for treating steel alloys through forging, rolling, deformation and the like. Still further in implementation, at the same time the rod is being heated to a temperature favorable for plastic deformation, a hot recrystallization of the rod takes place which eliminates inner stress of the rod that has accumulated during the course of the rod's operational life.

In certain embodiments the desired geometry of the used rods is obtained by treatment under pressure. In such embodiments, the cross sectional area of the rod is varied while the standard length of the rod is maintained. In such embodiments, mechanical properties of rods is enhanced during the pressure treatment such that a rod is structurally stronger in its peripheral zone. For example, by the reheating the rod body up to a temperature which would allow it to undergo plastic deformation under pressure, the rod is structurally stronger in the peripheral zone as compared to rods treated by other methods of reclamation. Additionally, the high temperature used to make the rod favorable for plastic deformation also allows the rod to be reshaped to the correct geometric form as before without any defects caused in the operations such as cracks or cavities.

In further embodiments, reheating the rod is specifically achieved through the use of an induction furnace. As is known in the art, an induction furnace is an electrical furnace in which the heat is applied by induction heating of metal. The advantage of the induction furnace is a clean, energy-efficient and well-controllable melting process compared to most other means of metal melting. Since no arc or combustion is used, the temperature of the rod can be set such that it is no higher than what is required to make it amenable to plastic deformation; this can prevent loss of valuable alloying elements. Operating frequencies range from utility frequency (50 or 60 Hz) to 400 kHz or higher, usually depending on the material being melted, the capacity of the furnace and the melting speed required. Generally, the smaller the volume of the melts, the higher the frequency of the furnace used; this is due to the skin depth which is a measure of the distance an alternating current can penetrate beneath the surface of a conductor. For the same conductivity, the higher frequencies have a shallow skin depth, in other words, that is less penetration into the melt. Lower frequencies can generate stirring or turbulence in the metal.

In still further embodiments, upon heating the used rod to a temperature favorable for plastic deformation, the used rod can be treated under pressure, typically by radial-helical rolling. As a sucker rod or pump rod is an elongated bar shape, under pressure treatment the cross-sectional diameter of the rod will decrease such that the rod can be reformed into the next smaller standard size if desired. After plastic deformation, besides shrinking the cross-sectional area, the length of the rod will be increased if the mass of the metal remains constant or near constant. Typically, the reduction in diameter is one size down in terms of standard rod size. However, reduction by several sizes would allow two sucker rods to be produced out of one parent sucker rod. The standard sizes for sucker rods in English measurements are 1", ⅞", ¾", and ⅝".

As the heating and shaping increases the length, the rods are cut before the heating and shaping to remove the ends.

Typically processed in one of two ways. In the first way, the rods simply have the ends cut off so that the rods are cut to the correct length and the remaining steel can be used to make pony rods. Alternatively, the ends can be cut off plus additional footage in the body of the rod in order to produce new bar stock that is the length needed to produce a new sucker rod.

After treatment via plastic deformation, the rods, such as sucker rods are raw bar stock that can be sold to users or other manufacturers in the petroleum industry. These rods can be made to a standardized length again by cold chiseling, abrasive cutting or both.

In this embodiment, the users or other manufacturers can forge the ends of the sucker rods to fit their particular equipment needs. Alternatively, an additional embodiment of the invention, the ends of the sucker rods are forged at the location, and can be made to a standardized length again by cold chiseling, abrasive cutting or both.

Shot Peening

Upon reformation, the rod is then cooled and stored for use or further treatments.

In certain embodiments, after cooling the rod, such as a sucker rod is subjected to shot peening. Shot peening is a cold working process in which the surface is bombarded with small spherical media called shot. As each individual shot particle strikes the surface, it produces a slight rounded depression. Plastic flow and radial stretching of the surface metal occur at the instant of contact and the edges of the depression rise slightly above the original surface. Benefits obtained by shot peening are the result of the effect of the compressive stress and the cold working induced. Compressive stresses are beneficial in increasing resistance to fatigue failures, corrosion fatigue, stress corrosion cracking, and hydrogen assisted cracking. Shot peening is effective in reducing sucker rod fatigue failures caused by cyclic loading. Stress corrosion cracking cannot occur in an area of compressive stress. The compressive stresses induced by shot peening can effectively overcome the surface tensile stresses that cause stress corrosion. Shot peening has been shown to be effective in retarding the migration of hydrogen through metal. Shot peening improves the surface integrity of the sucker rod. As peening cold-works the rod surface, it blends small surface imperfections and effectively eliminates them as stress concentration points.

Final Inspection

In certain embodiments of the invention, following the sorting, cleaning, straightening, heating and shaping of the rods, the rods are subject to a final inspection. Typically such inspection is eddy current inspection. Eddy-current inspection uses electromagnetic induction to detect flaws in conductive materials. In a standard eddy current inspection a circular coil carrying current is placed in proximity to the sucker rod. The alternating current in the coil generates changing magnetic field which interacts with sucker rod and generates an eddy current. Variations in the phase and magnitude of these eddy currents can be monitored using a second receiver coil, or by measuring changes to the current flowing in the primary coil. Variations in the electrical conductivity or magnetic permeability of the test object, or the presence of any flaws, will cause a change in eddy current and a corresponding change in the phase and amplitude of the measured current.

Implementation

In implementation of the aforementioned embodiments and methods, and referring to FIG. 1, rods, hereinafter for simplicity referred to as sucker rods, are collected from upstream petroleum producing sites via a collection process 1. Alternatively, the sucker rods are shipped to a common location via a shipment process 2. The sucker rods are then subjected to presortment 3. First, the sucker rods are scanned through non-visual magnetic flux leakage inspection to sort out flaws in the sucker rods. Sucker rods which have failed inspection are subject to a discarding process 4. Sucker rods which have not failed this inspection are subjected to a grade sortment procedure 5 to sort out the grade of steel, such as C 6, D 7, KD 8 and High Strength 9. Sucker rods which have not failed inspection due to extensive cracks or extensive corrosion, and have been sorted are then subjected to a cleaning procedure 10.

In a preferred implementation, the sucker rods, separated by grade of steel, are taken to a plant. Each grade of sucker rods is treated in turn. In the plant, the sucker rods are first cleaned.

After cleaning, each sucker rod in need of straightening is subjected to a rod straightening machine 11. After straightening, the rods are capable of being heated and shaped.

In the step of heating and shaping, each rod is placed upon a conveyor which transports each sucker rod through an induction furnace 12 or a series of induction furnaces with a temperature of between about 900° C. to about 1300° C. The heating is designed not to melt the sucker rod but to soften each sucker rod to the point wherein plastic deformation is possible.

Following heating to the point wherein plastic deformation is possible, the sucker rod is subjected to a pressure machine 13 in order to smooth out any surface imperfections. This process compresses the sucker rod such that the cross sectional area is changed.

Upon shaping, the conveyor removes the sucker rod from the pressure machine and the sucker rod is allowed to cool. After cooling, the sucker rod is optionally subjected to shot peening 14. Regardless of whether the sucker rod is subjected to shot peening, the sucker rod is optionally cut to a desired length through a cutting procedure 15. When cut to a desired length, the sucker rod is then subjected to a final inspection process 16. Generally, the inspection process is eddy current inspection. After inspection, the sucker rod is shipped to an outside manufacturer 17 in order to forge end pieces on the sucker rod for appropriate applications. Optionally, factory forging 18 is done wherein the forging is done at the same location as where the rod is heated and shaped.

It should be appreciated by those of skill in the art that the techniques disclosed in the aforementioned embodiments represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the invention.

REFERENCES

U.S. Pat. No. 7,985,938
RU 2082590

The invention claimed is:

1. A method for reconditioning a used sucker rod having a given diameter, the method comprising the steps of:
   a. obtaining a used sucker rod having a diameter and a length;
   b. removing contaminates from the surface of the sucker rod;

c. performing a non-visual inspection of the used sucker rod to determine if the sucker rod is amenable to reconditioning;
d. utilizing a metal analyzer to determine a metal composition of the sucker rod;
e. categorizing the sucker rod into a class based upon the metal composition of the sucker rod;
f. heating the rod to a temperature between about 900° C. to about 1300° C. until the rod is able to undergo plastic deformation;
g. shaping the rod at a temperature wherein plastic deformation occurs;
h. cooling the rod;
i. cutting the sucker rod into a desired length; and
j. forging end pieces onto the rods.

2. The method of claim 1 wherein the metal analyzer is handheld.

3. The method of claim 1 wherein the metal analyzer is in-line.

4. The method of claim 1 wherein the metal analyzer utilizes X-ray fluorescence spectrometry.

5. The method of claim 1 wherein the metal analyzer utilizes X-ray diffraction.

6. The method of claim 1 wherein the metal analyzer utilizes arc spark optical emission spectrometry.

7. The method of claim 1 wherein the metal analyzer utilizes a laser metals analyzer.

8. The method of claim 1 wherein the metal analyzer utilizes laser induce breakdown spectroscopy.

9. The method of claim 1 wherein the metal analyzer causes a high temperature plasma to form.

* * * * *